(12) United States Patent
Andersen

(10) Patent No.: US 7,625,267 B2
(45) Date of Patent: Dec. 1, 2009

(54) DEVICE AND A METHOD FOR FIXING A CARCASS

(75) Inventor: Peter Andersen, Frederikssund (DK)

(73) Assignee: Slagteriernes Forskningsinstitut, Roskilde (DK)

( * ) Notice: Subject to any disclaimer, the term of this patent is extended or adjusted under 35 U.S.C. 154(b) by 0 days.

(21) Appl. No.: 12/043,826

(22) Filed: Mar. 6, 2008

(65) Prior Publication Data
US 2008/0220706 A1 Sep. 11, 2008

(30) Foreign Application Priority Data
Mar. 6, 2007 (DK) .............................. 2007 00339

(51) Int. Cl.
*A22B 3/10* (2006.01)
(52) U.S. Cl. ....................................... 452/65
(58) Field of Classification Search ............... 452/64, 452/63, 166–170; 606/51, 52, 108, 174, 606/205–211
See application file for complete search history.

(56) References Cited

U.S. PATENT DOCUMENTS 4,513,741 A * 4/1985 Demi ..................... 128/205.25
5,562,701 A * 10/1996 Huitema et al. ............. 606/159

FOREIGN PATENT DOCUMENTS

| EP | 0 180 454 | 5/1986 |
|----|-----------|--------|
| EP | 1 135 988 | 9/2001 |
| IE | 42913 | 10/1975 |
| NL | 7.504.417 | 10/1975 |
| WO | WO-94/14325 | 7/1994 |
| WO | WO-94/24873 | 11/1994 |
| WO | WO-2005/094593 | 10/2005 |

OTHER PUBLICATIONS

European Search Report for Application No. EP08388009, dated May 27, 2008.

* cited by examiner

*Primary Examiner*—Thomas Price
(74) *Attorney, Agent, or Firm*—Marshall, Gerstein & Borun LLP

(57) ABSTRACT

The invention relates to a fixation device (1) and a method for fixating a carcass, e.g. during processing the carcass at a slaughterhouse, such as a carcass hanging head-down from a gambrel, wherein the device (1) comprises mouth-engaging fixation means.

6 Claims, 8 Drawing Sheets

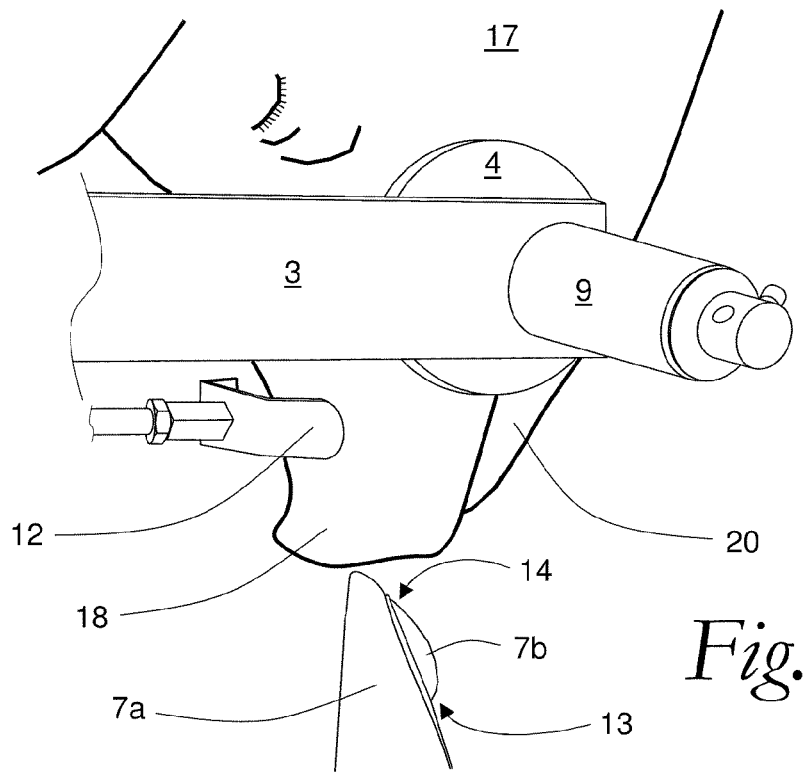
*Fig.* 3a
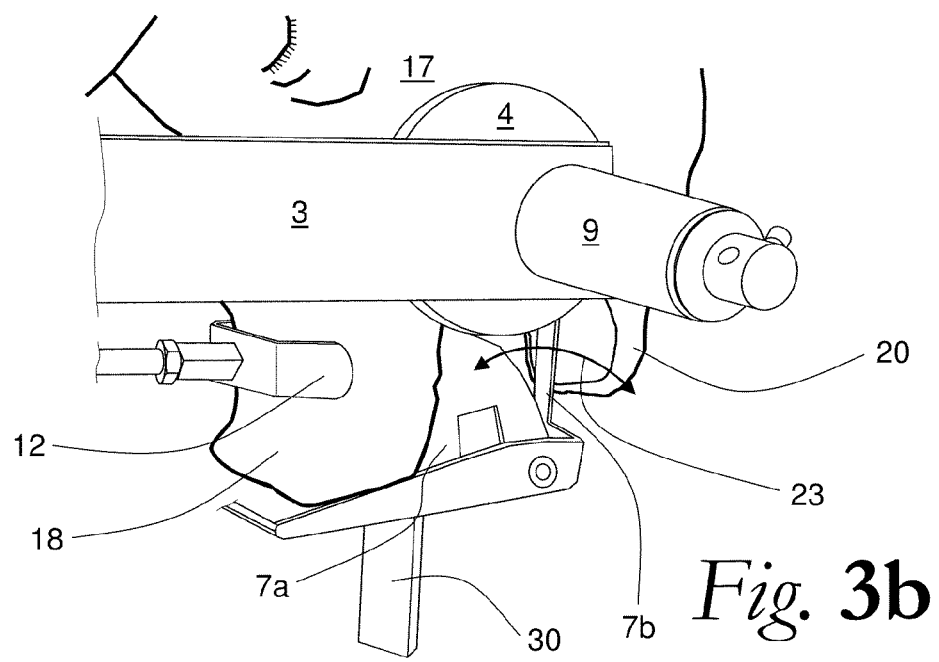
*Fig.* 3b

DEVICE AND A METHOD FOR FIXING A CARCASS

REFERENCE TO RELATED APPLICATIONS

This application claims priority to Danish application DK 2007 00339, filed Mar. 6, 2007, as to all subject matter commonly disclosed therein.

FIELD OF THE DISCLOSURE

The present disclosure relates to a fixing device for fixing a carcass, e.g. during processing at a slaughterhouse, such as a carcass hanging head-down from a gambrel.

BACKGROUND OF THE DISCLOSURE

The demand for effective and secure fixing of carcasses in slaughter-houses is increasing. This is in particular true for modern slaughterhouses having a high degree of automation and a high throughput. Some modern slaughterhouses process about 400 carcasses per hour, meaning that a carcass must be processed in less than 10 seconds. This ever-increasing pace intensifies the workload and the demand for effective processes at the slaughterhouse. To ensure efficient slaughtering of the animal and efficient cutting-out of the meat, both contributing to high yield, it is necessary to provide quick and secure fixing of the carcass.

Various solutions for fixing carcasses are known in the art. One example is the device for fixing a carcass disclosed in International Patent Application No. WO 05/94593. The carcass has an incision through the abdomen, the chest and part of the throat. The carcass is hanging by its hind legs from a gambrel and is fixed by means of hooks or shackles, which are arranged around the forelegs and which pulls the carcass backwards—that is, in a horizontal direction towards the back of the carcass—so that its back is pressed against an abutment. The pull exerted by the shackles on the forelegs causes the carcass to open at the incision.

Further, the head of the carcass is secured by means of a vertically operating, self-positioning forehead rest, which adjusts to the anatomy of the carcass.

This application also teaches cutting the larynx from the throat back side by means of a cutting tool inserted into the throat from above, that is, from the chest cavity, and performing a downwards cutting movement along the back of the throat.

Another example is the device for fixing a carcass disclosed in International Patent Application No. WO 94/24873. In this device, an animal carcass is hanging head-down from a gambrel, and a gripping means grips the snout of the animal and exercises a downward force on the carcass, thereby stretching the carcass. The device further comprises an arm engaging the pubic bone of the carcass to position and stretch the carcass.

An apparatus for automatically cutting the jowl of a carcass is disclosed in European Patent No. 1.135.988. Also here, the carcass is hanging head-down from a gambrel. The apparatus comprises a hook adapted for engaging the mandibular angle through a cut in the throat.

European Patent No. 673.202 relates to an apparatus for fixing a carcass in an ergonomically correct position for slaughtering by a butcher. The carcass is hanging head-down from a gambrel and is fixed by a fixing means fixing the front legs of the carcass.

Objects of the disclosure are to provide an improved fixing device and method, which will quickly and securely fix the fore-end of a carcass; which will keep a lengthwise cut through belly and throat towards the mandible angle open for slaughter operations to be performed; which will fix the fore-end of the carcass in a way facilitating slaughter operations made to the head or head end of the carcass; which will enable slaughter operations to be made through the mouth of the carcass; and which will fix the carcass in a way suitable for automated operations, that is, where the positions of the various parts of the carcass are well defined.

SUMMARY OF THE DISCLOSURE

To meet these objects, the device according to the disclosure comprises mouth-engaging fixing means. Hereby a secure fixing can be achieved with minimum effect on the carcass. For example, it will not be necessary to provide any additional cuts on the carcass, which would reduce the value of the carcass and would be time-consuming in any case. In addition, the risk of contamination and cross-contamination is limited, as the equipment will normally not be soiled. Further, by engaging the mouth of the carcass, the apparatus is less prone to failure of fixing, e.g. caused by variation in anatomy of the carcass, slippery outer surfaces of the carcass or similar. Cleaning of the device is easy as the fixing device is of relatively simple construction.

Possible embodiments include for example a mouth-engaging assembly comprising a balloon, which may be inflated within the oral cavity of the carcass. Further, it may in some applications be satisfactory to use a single hook element, which for example may anchor in the lower jaw inside the mouth. According to one preferred embodiment, however, the mouth-engaging fixing means comprises a palate-engaging element and a jaw-engaging element.

(In the present disclosure, the term 'lower jaw' indicates the mandible with associated teeth and tissue—contrary to the 'upper jaw' which would then comprise upper teeth, palate and soft palate.)

Said engaging elements preferably engage the mouth of the carcass by opening or expanding inside the mouth, thereby forcing the mouth to open more or less. The resistance of the mouth to being opened will then provide the desired fixing forces.

According to another embodiment, the device further comprises an abutment element adapted for abutting a top side of the carcass, such as a snout or forehead of the carcass, whereby the position of the head of the carcass is well defined, and the abutment may also provide for a more secure fixing, as the snout may be gripped between the abutment element and the palate-engaging element.

To facilitate insertion of the mouth-engaging assembly into the mouth of the carcass, the device may further comprise mouth-opening means.

Such mouth-opening means may be provided in a number of different ways, for example as static elements, which will engage the jaws to open the mouth of the carcass, when the carcass is placed in the device. Alternatively the mouth may be opened by for example engaging the lower jaw with a sucker to move the jaw.

According to one embodiment, however, the mouth-opening means comprises a set of thrust pads facing each other, said thrust pads being movable from an inactive position to an active position, exerting a pressure on the sides of the head of the carcass and thereby opening its mouth somewhat. When the mouth of the carcass has been opened this way, insertion of the mouth-engaging assembly into the mouth of the carcass follows relatively easily and in an uncomplicated manner.

The thrust pads may for example be adapted to abut the jowls of the carcass head and press the jowls to open the mouth. Such an embodiment will be relatively tolerant regarding its adjustment to the positioning of the carcass and variation in anatomy of the carcass. As the mouth-opening means is relatively simple and engage the sides of the head only, cleaning of the mouth-opening means will be easy.

Synergy may be achieved by further providing the device with a cutter movable along the palate-engaging element for cutting the tonsils of the carcass. Hereby the palate-engaging element additionally serves as a guide for the cutter and as a shield, preventing accidental cutting of e.g. the palate or the tongue. Cutting the palate could lead to the cutter getting stuck, whereas cutting the tongue would reduce the market value of the tongue. The cutter can hence be guided to the tonsils for cutting thereof, either as a pre-cut or a full cutting of the tonsils.

In this description, 'tonsils' designate the palatine tonsils, in particular tonsilla veli palatini of swine.

In order to meet the above-mentioned objects, the disclosure further relates to a method for fixing a carcass, e.g. during processing at a slaughterhouse, such as a carcass hanging head-down from a gambrel, the method being characteristic in comprising the steps of: introducing mouth-engaging fixing means into the mouth of the carcass; and engaging the mouth-engaging fixing means in the mouth of the carcass. This method allows for quick and secure fixing of the carcass as the number of steps required is very limited, and the method is very tolerant with regard to variations in anatomy of carcasses.

According to one embodiment of the method, the mouth-engaging fixing means comprises a palate-engaging element and a jaw-engaging element, and the step of engaging the mouth-engaging fixing means with the mouth of the carcass comprises the procedures of engaging the palate-engaging element with the palate of the carcass and engaging the lower-jaw-engaging element with the jaw of the carcass. Hereby a quick and reliable method of fixing is provided.

To facilitate introduction of the mouth-engaging fixing means, the method may comprise an initial step of opening the mouth of the carcass by means of a mouth opening means.

According to another embodiment, this step of opening the mouth comprises moving a set of thrust pads towards each other from inactive positions to active positions in engagement with opposing sides of the head of the carcass, thereby exerting a pressure on each side of the head. In this embodiment, opening the mouth can be achieved with little risk of damage to the carcass and with little consequence from anatomic variations of the carcass.

The carcass having been fixed, it will be advantageous that the method further comprises a step of cutting the tonsils of the carcass by advancing a cutter along the palate-engaging element. By using the palate-engaging element as a guide, a very efficient and safe cutting of the tonsils can be achieved as e.g. the risk of the cutter getting stuck; the risk of damaging the tonsils; and the risk of damaging valuable parts such as the tongue are all very limited.

SHORT DESCRIPTION OF DRAWING

FIG. 1b is a schematic top view of the fixing device of FIG. 1a;

Figure 2A:
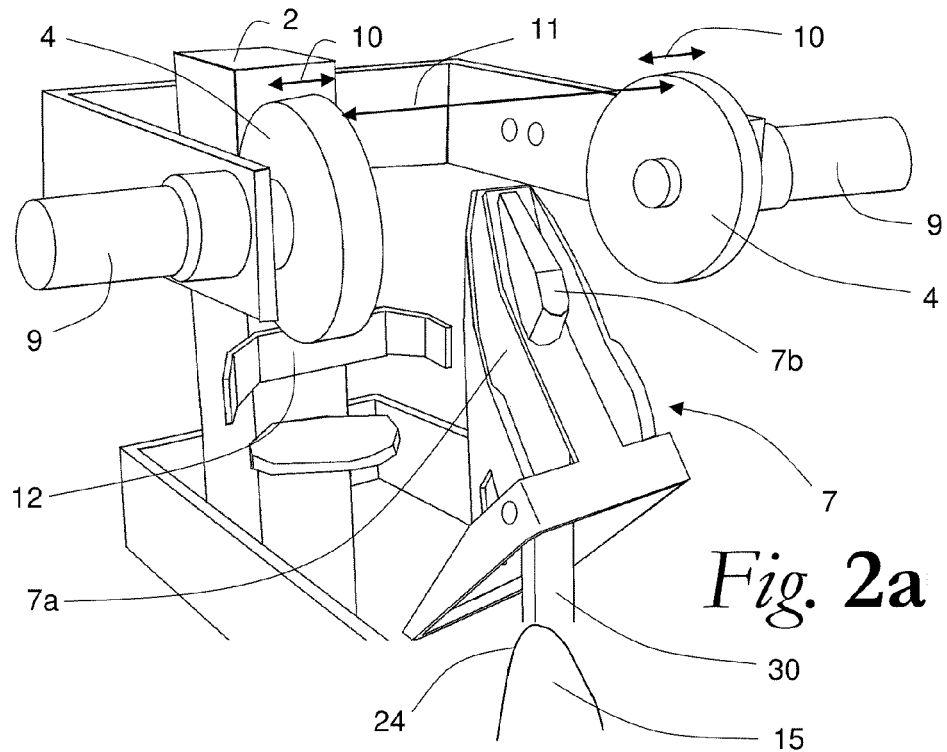
FIG. 2a is a schematic, perspective view of part of a second embodiment of a fixing device according to the disclosure, in a first position.
Figure 2B:
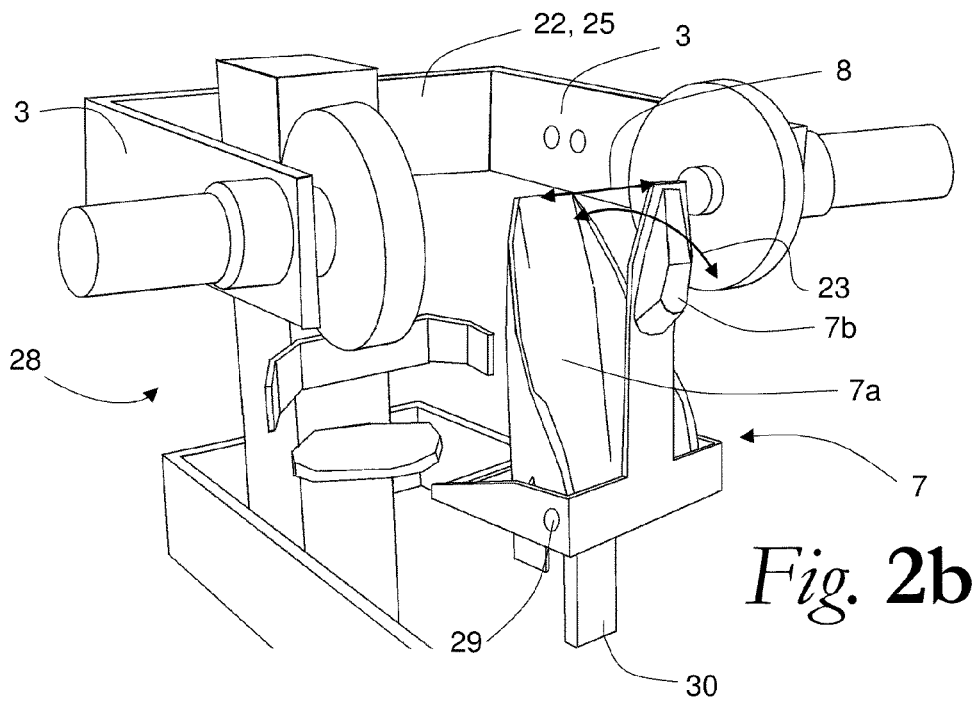
FIG. 2b is corresponds to FIG. 2a, the fixing device being in a second position.
Figure 2C:
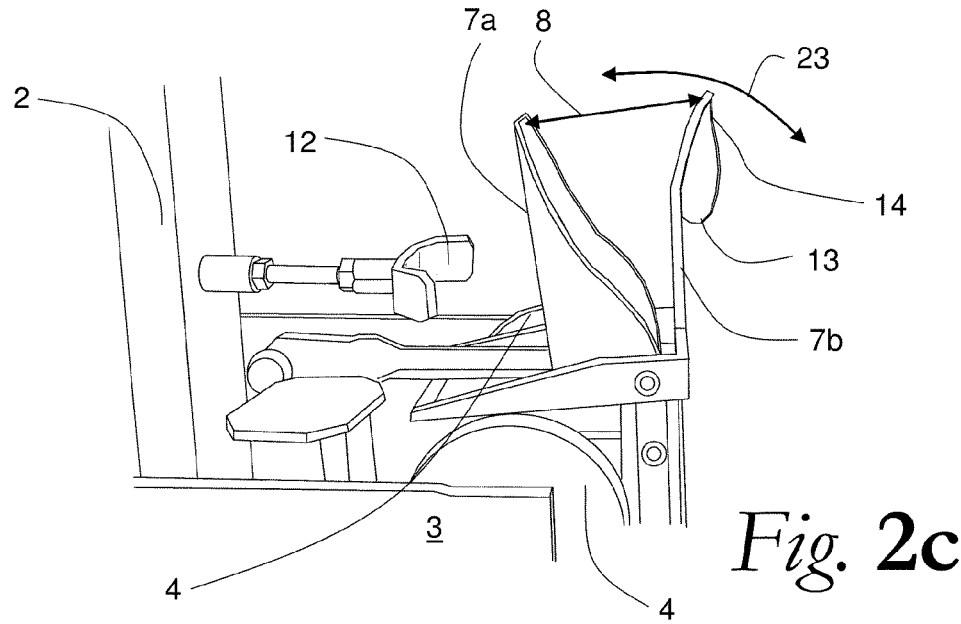
FIG. 2c is a side view corresponding to FIG. 2b, the mouth opening means having been lowered for better view.
Figure 2D:
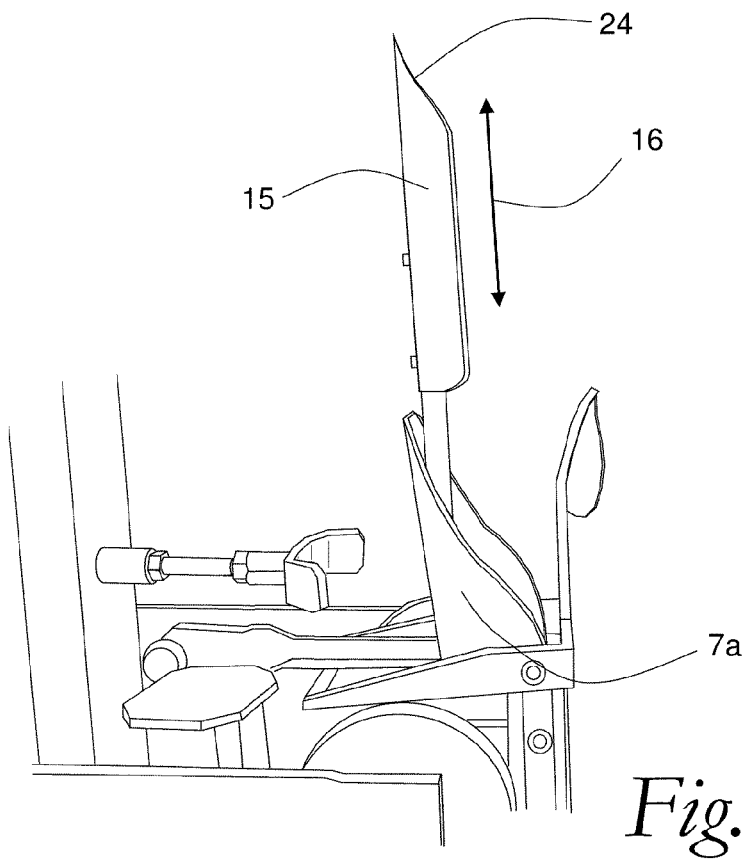
Figure 3C:
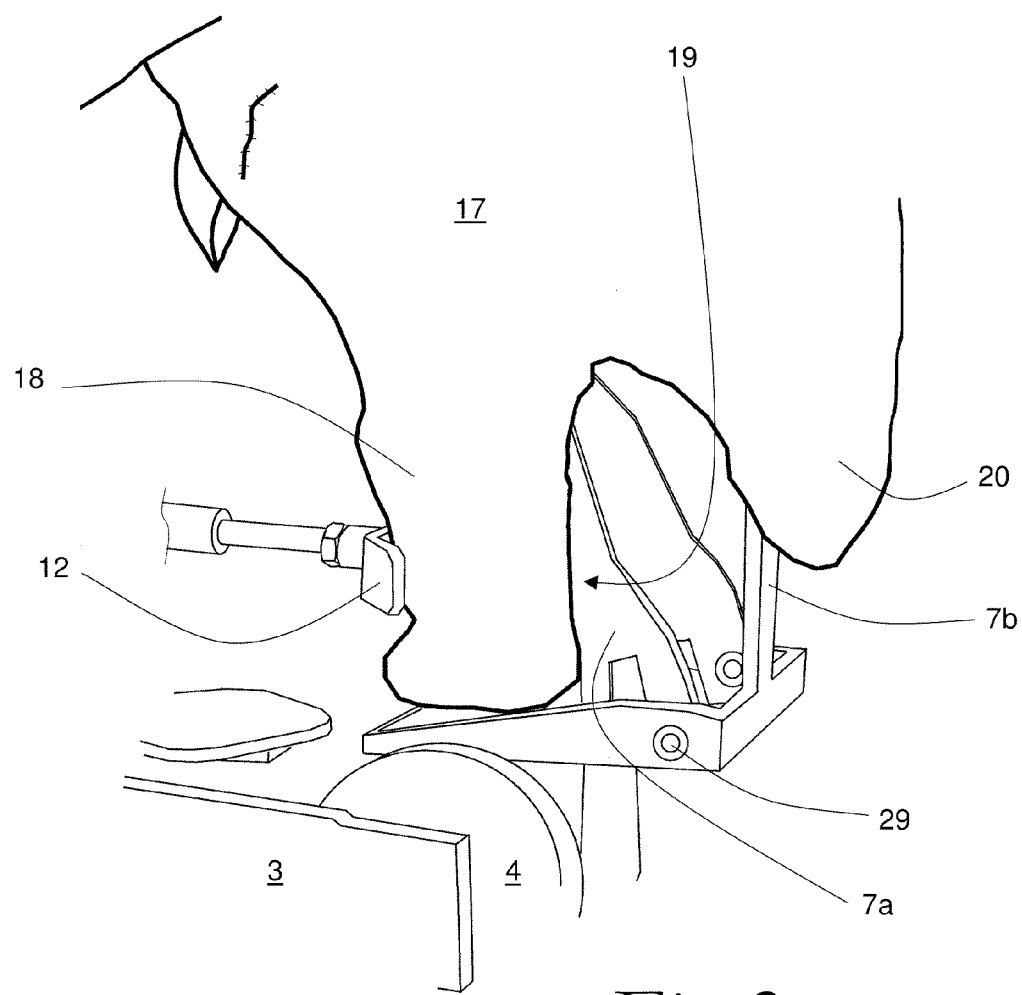
Figure 4:
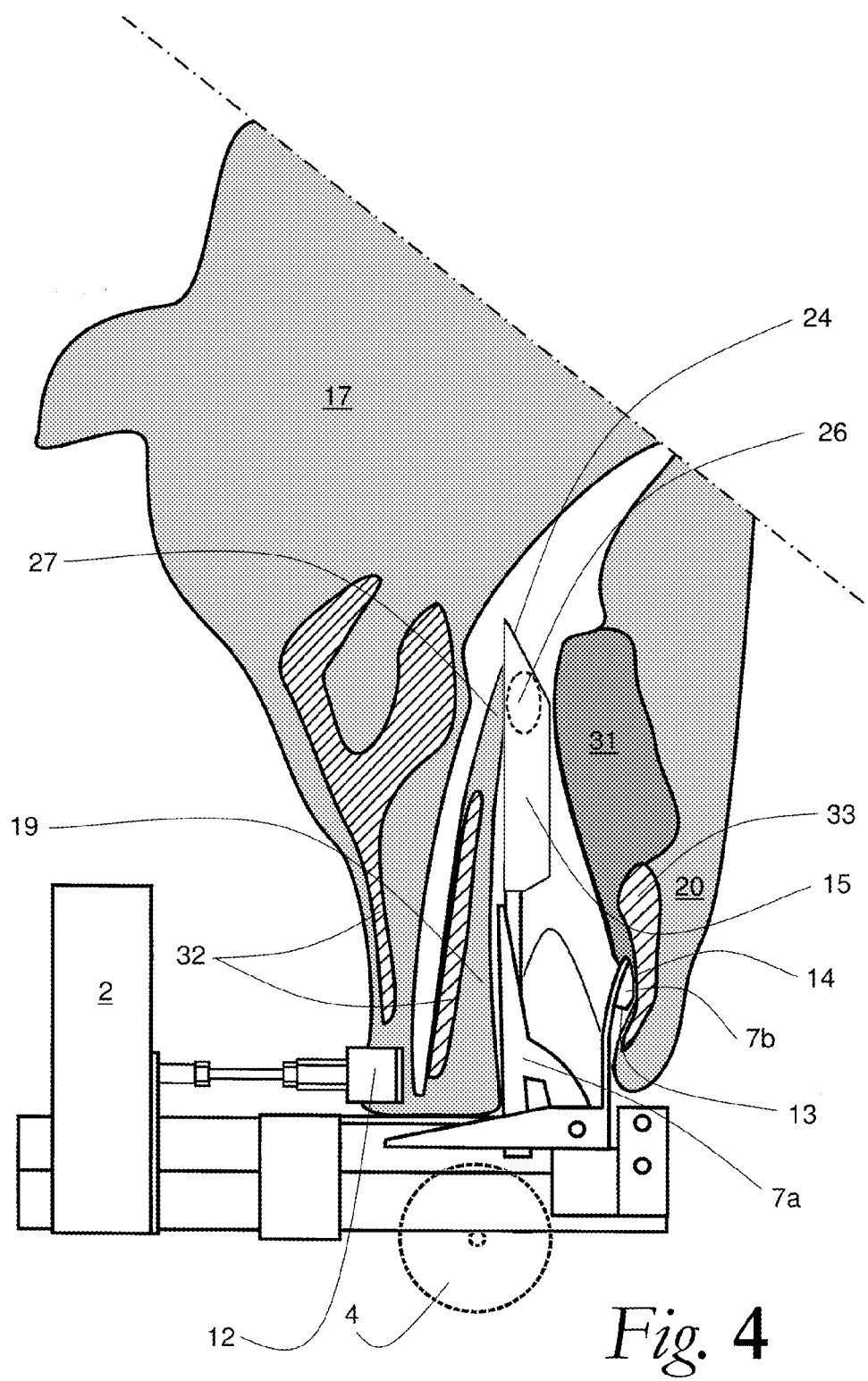
Figure 5:
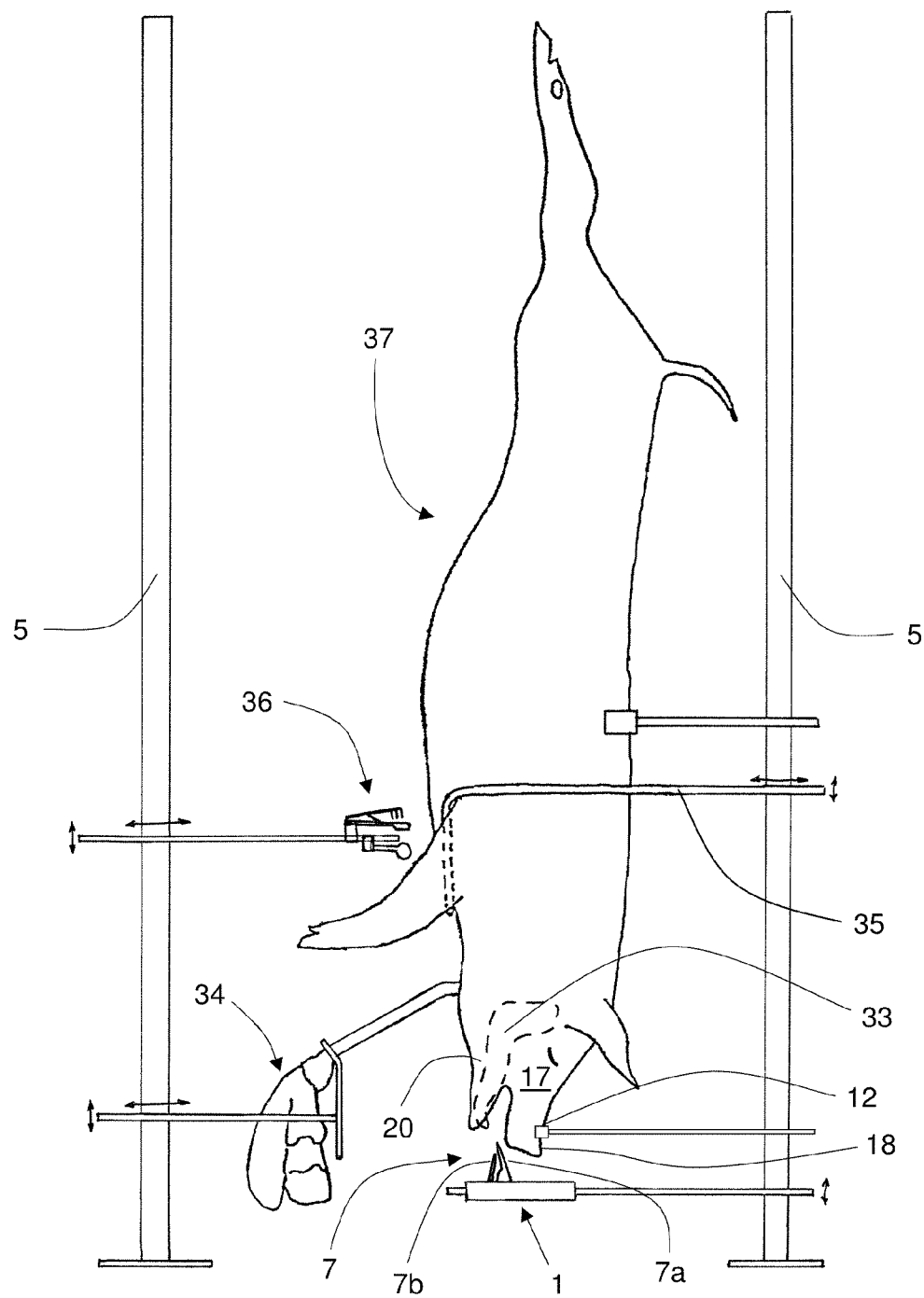

FIG. 2d corresponds to FIG. 2c and further shows a cutter according to an embodiment of the invention in an advanced position;

FIG. 3a is a schematic, perspective view of the fixing device of the second embodiment, fixing a carcass head, the mouth opening means being in an inactive position;

FIG. 3b corresponds to FIG. 3a and shows a mouth-engaging assembly having been advanced into the mouth of the carcass;

FIG. 3c is a schematic, perspective view of the fixing device of the second embodiment, showing the mouth-engaging assembly now in an active position, fixing the carcass head by engaging the mouth of the carcass;

FIG. 4 is a sketch corresponding to FIG. 3c with the carcass head being shown in schematic section; and FIG. 5 is a schematic sketch showing an automated machine incorporating the fixing device according to the disclosure as well as automated machinery for performing certain slaughter operations.

The fixing devices of the first and second embodiments are very similar. In all figures, parts and portions of parts not necessary for the understanding of the description have been omitted for clarity. Corresponding parts are referred to by same numeral throughout the figures. In the similar views of FIGS. 2a-2b and 3a-3b, respectively, some of the reference designations are shown in one of the figures only.

DETAILED DESCRIPTION OF THE PREFERRED EMBODIMENTS

The present fixing device is suitable for being mounted into a piece of automated slaughtering machinery where there is a need for fixing a carcass during slaughter operations, and in particular where there is a need for precise and secure fixing of the head portion or fore-end of the carcass.

The present disclosure relates to the fixing device as a more or less self-contained unit, that is, a unit fixing the carcass head portion or fore-end to a section of machinery in which the fixing device is mounted. That machinery, the mounting of the fixing device in that machinery, and the controls necessary for controlling the fixing device during use are not disclosed here, as the skilled person will be able to provide adequate solutions to this end.

FIG. 5 shows in a schematic way a possible design of an automated machine for performing certain slaughter operations such as loosening a plucks set from a pig carcass, including cutting of the tonsils. The machine comprises various tools and devices, e.g. 1, 12, 35, 36, the mounting of which in the machine is schematically illustrated by their connections to two pillars. In particular, the machine comprises a fixing device 1 according to the present disclosure.

Figure 1A:
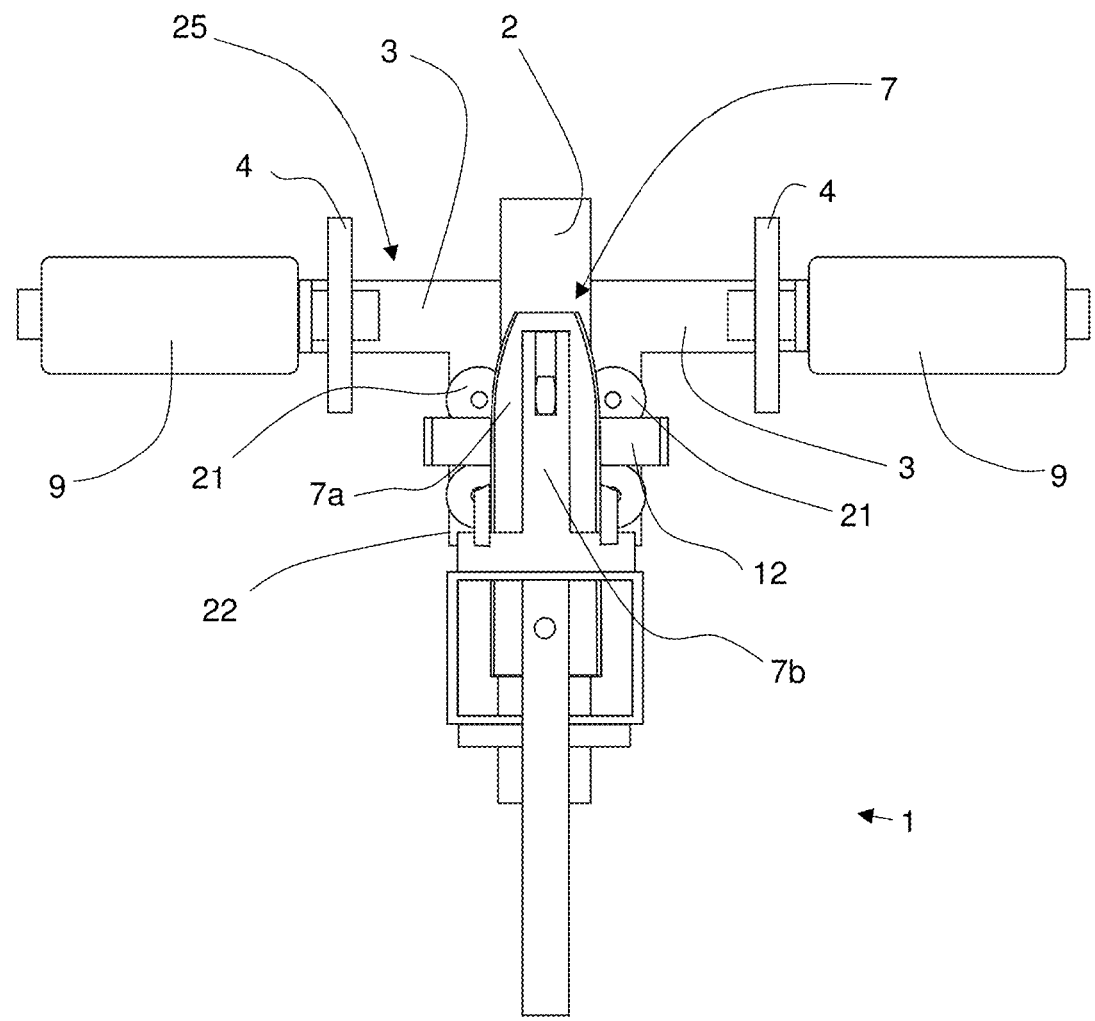
FIG. 1a is a schematic front view of a first embodiment of a fixing device according to the disclosure.
Figure 1B:
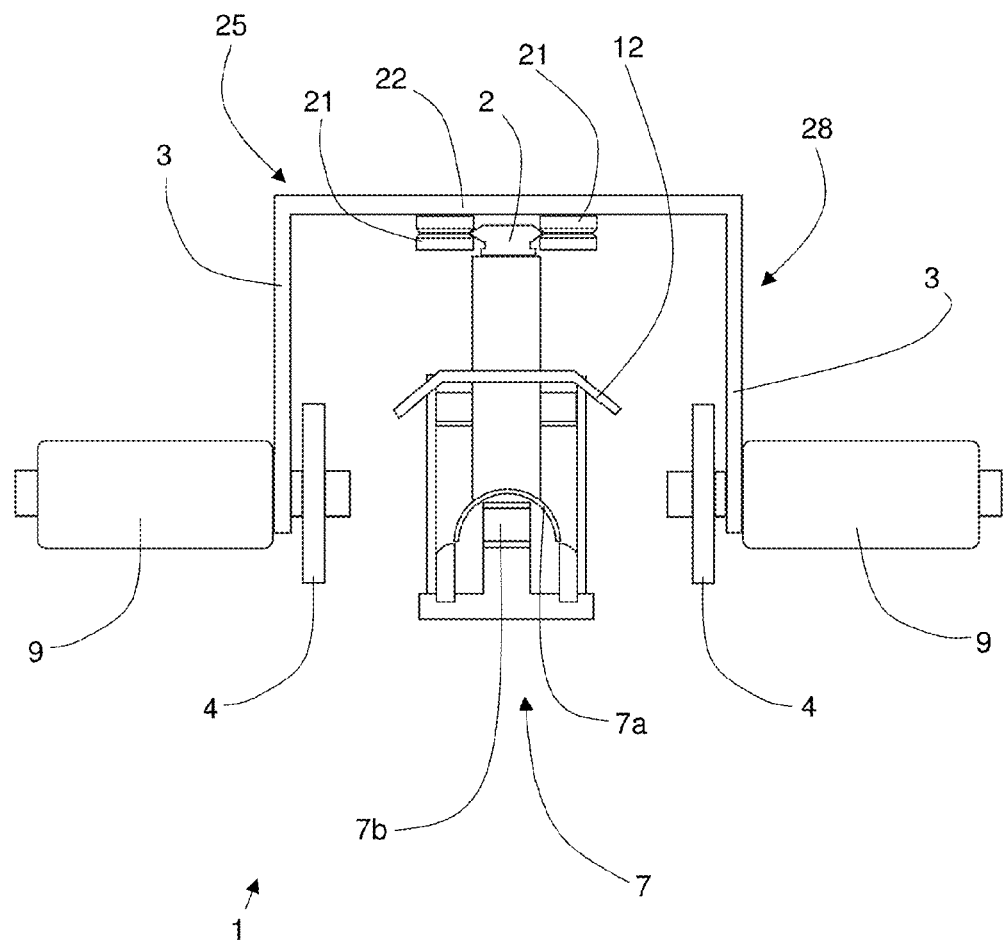

From the schematic illustrations of FIGS. 1a, 1b and 4, and the perspective views of FIGS. 2a to 3c, the general setup of a fixing device 1 according to the disclosure may be assessed. The fixing device 1 constitutes a mouth-engaging fixing device for engaging the mouth of a carcass, such as a slaughter hog hanging head-down, thereby fixing the carcass in a way suitable for carrying out automated slaughtering procedures.

The principles of the fixing device of the disclosure have been investigated with a prototype, perspective views of which are seen in FIGS. 2a-3c, which also illustrate method steps according to the disclosure.

The fixing device 1 comprises a vertical rail 2 forming part of a frame of the device and having a carriage 25 running thereon, running on four wheels 21 (FIGS. 1a-1b) and movable in the direction of the longitudinal extension of the rail. The carriage 25 has a frame 22, carrying two arms 3, at the free ends of which actuators such as e.g. pneumatic cylinders 9 are arranged, with their piston rods (not shown) at a common axis, pointing towards each other. A thrust pad 4 is mounted on each piston rod, so that the thrust pads 4 are movable as indicated by arrows 10 (FIG. 2a) from first, retracted positions (as shown in FIGS. 1a-2b) with a relatively large distance 11 between the facing thrust pads 4, in directions (10) towards each other into second, extended positions with a relatively small distance (11) between the facing thrust pads 4. The frame 22 with its arms 3 and thrust pads 4 thus constitute a gripping device 28, gripping and compressing any body situated between the thrust pads 4, when the pneumatic cylinders 9 are actuated. Hydraulic cylinders or any other kind of linear actuators may be used as well.

In the embodiment shown, the thrust pads 4 are circular discs having a central projecting boss. It will be evident to the skilled person that other shapes of thrust pads or different embodiments of the gripping device 28 may also be functional.

The gripping device 28 as a whole may be moved in a vertical direction, that is, adjusted in height, by the carriage 25 running on the rail 2. Such vertical displacement of the thrust pads 4 may be achieved in other ways, such as by the arms 3 being swingable. Alternatively, the motion may be dispensed with.

The gripping device 28 constitutes a mouth-opening means or mechanism, as will be discussed in more detail below.

A snout-abutting element 12 is fixed to the rail 2 as is best seen in FIGS. 2c-2d; this element will be described in more detail in the following.

The fixing device 1 further comprises a mouth-engaging assembly 7 (FIGS. 1b-2c). In the embodiment shown, the mouth-engaging assembly 7 comprises a palate-engaging element 7a and a lower-jaw-engaging element 7b.

In the prototype, the palate-engaging element 7a is curved or U-shaped in cross-section. It is generally preferred that the carcass-abutting faces of the palate-engaging element 7a and the lower-jaw-engaging element 7b are smooth for easy cleaning thereof. However, to enhance the grip of the palate-engaging element 7a and the lower-jaw-engaging element 7b, the carcass-engaging faces of one or both elements may be corrugated or even provided with teeth or similar friction-enhancing means.

In the embodiment shown in FIGS. 1a-3c, the palate-engaging element 7a has a downward-protruding mounting bracket 30, so that it may be mounted on a suitable actuator for being moved upwards and downwards (as illustrated by FIGS. 3a-3b), the bracket 30 being fixed to suitable actuating and guiding means. The skilled person will be able to provide solutions for this.

The lower-jaw-engaging element 7b is swingable relative to the palate-engaging element 7a around a shaft or pin 29 (FIGS. 2b, 3c) so that it may swing through an arcuate movement 23 (FIGS. 2b-2c, 3b), thereby increasing the distance 8 of the lower-jaw-engaging element 7b from the palate-engaging element 7a.

In FIG. 2a, the mouth-engaging assembly 7 is shown in an inactive position, in which the lower-jaw-engaging element 7b is swung into a close relationship with the palate-engaging element 7a, so that the mouth-engaging assembly 7 takes a wedge-like shape, suitable for insertion into a mouth of an animal carcass. In the present embodiment, only the part 7b is swingable, as illustrated by arrow 23 (FIGS. 2b-2c, 3b).

In FIG. 2b, the mouth-engaging assembly 7 is shown in an active position, in which the lower-jaw-engaging element 7b has been swung in the direction 23 away from the palate-engaging element 7a, thus increasing the distance 8 between the two engaging elements, in order that they may engage firmly inside the mouth of the animal carcass as illustrated in FIGS. 3c, 4. The lower-jaw-engaging element 7b is preferably moved by a constant-force actuator such as a pneumatic cylinder, in order to engage the jaw of the carcass with a controlled and predictable force.

In FIG. 2c, the gripping device 28 with the thrust pads 4 has now been lowered by displacing the carriage 25 on the rail 2. Lowering the thrust pads 4 this way provides easy access to the sides of the carcass head for certain slaughter operations as e.g. cutting the jowls of the carcass.

When a carcass is placed in the fixing device 1, the snout of the carcass head will abut an abutment element 12 (FIGS. 3a-5). The abutment element 12 is illustrated as a static element, but may be coupled to an actuator for adjustment or for clamping the snout of the carcass more securely. With an abutment element 12 which is somewhat curved as illustrated, a certain degree of sideways stabilising of the head of the carcass is achieved.

Secure abutment of the snout on the abutment element 12 may be secured by pulling the carcass towards the abutment element 12 by suitable means. Such means may e.g. be displacing the gambrel (not shown) from which the carcass is hanging, in a backwards direction, that is, in a direction parallel to the direction from the mouth-engaging assembly 7 towards the abutment element 12 (towards the right in FIG. 5), so that the carcass will lean against the abutment element 12.

In a preferred embodiment of the present fixing device, however, hooks or shackles 35 (FIG. 5) as disclosed in WO 05/94593 are used to pull the forelegs of the carcass in the above-mentioned backwards direction. This will ensure as well an advantageous opening of the incision through throat and abdomen, providing access to the throat and chest cavities of the carcass for slaughter operations.

The lower-jaw-engaging element 7b in the prototype features a taper element 14 at its front end, which will facilitate insertion into the mouth of the carcass (FIGS. 2c, 3a), whereas a rear end 13 of the taper element 14 is blunt and shaped to releasably engage the lower jaw of the carcass when the lower-jaw-engaging element 7b is swung into the active position shown in FIGS. 2b-2d. This releasable engagement is illustrated in FIG. 4.

As an additional feature, the embodiment shown in FIGS. 2a-4 comprises a cutter 15 arranged to be movable upwards along the palate-engaging element 7a as illustrated by the arrow 16 in FIG. 2d. In FIGS. 2d and 4, the cutter 15 is shown in its uppermost end position. The cutter 15 is made from sheet and has an arcuate cross-sectional shape, which is corresponding to the shape of the palate-engaging element 7a, and it is thus able to be displaced into the mouth of the carcass (FIG. 4), sliding along the surface of the palate-engaging element 7a, which hereby acts as guide for the cutter 15. In the prototype illustrated, the cutter 15 comprises a pointed and sharpened cutting edge 24 at its forward end (its upper end in the figures).

The functioning of the cutter 15 will be explained below with reference to FIG. 4.

Interaction of the device with a carcass is to be seen in FIGS. 3a-4, which represent successive steps in the fixing of a carcass by means of the device.

In FIG. 3a, part of the head 17 of a pig carcass, which is hanging head-down from a gambrel (not shown), may be seen. The head has been brought into the fixing device 1, and the carcass is hanging freely suspended from the gambrel, the device still being inactive. The mouth-engaging assembly 7 comprising the palate-engaging element 7a and the lower-jaw-engaging element 7b is seen in a lowered, inactive position outside the mouth of the carcass, and the mouth of the carcass is more or less closed. The thrust pads 4 are also inactive, the pneumatic cylinders 9 having not yet been activated. The snout 18 of the carcass is not yet abutting the snout-abutting element 12 of the fixing device 1.

In a subsequent step, the thrust pads 4 are advanced by means of the pneumatic cylinders 9 to engage and press onto the jowls of the carcass, thereby opening somewhat the mouth of the carcass. The opening of the mouth helps to ensure that the snout 18 of the carcass abuts the snout-abutting element 12, thereby defining the position of the mouth relative to the fixing device 1.

As explained above, the snout 18 of the carcass may be made to lean on the abutment 12 by other means, such as displacing the gambrel or pulling the forelegs backwards by means of hooks or shackles.

Following this, the mouth-engaging assembly 7 is displaced upwards, into an active position inside the opened-up mouth of the carcass, and the thrust pads 4 are retracted again and the mouth-engaging assembly 7 opened to engage in the mouth of the carcass. The resulting situation is illustrated in FIG. 3b and more clearly in FIG. 3c. It appears most clearly from FIG. 3c that the lower-jaw-engaging element 7b has now been swung into an open position, that is, swung away from the palate-engaging element 7a. The top end of the cutter 15 with its sharpened cutting edge 24 can be faintly seen in FIG. 2a, the cutter 15 having been lowered into an inactive position.

FIG. 3c illustrates basically the same step as FIG. 3b, but the thrust pads 4 are now lowered. Here it can be clearly seen that the palate-engaging element 7a is indeed engaging the palate 19. Further it appears clearly from FIG. 3c that the lower-jaw-engaging element 7b has now been swung away from the palate-engaging element 7a, thereby engaging the lower jaw 20 of the carcass and forcing its mouth further open. As the carcass will resist such opening of its mouth with considerable resistance, corresponding force will be exerted by the palate-engaging element 7a on the palate of the carcass, and by the lower-jaw-engaging element 7b on its jaw. Hereby, the head of the carcass is now firmly fixed in the fixing device 1 by the action of the engaging elements 7a, 7b.

FIG. 4 is a sketch corresponding to FIG. 3c with the head 17 of the pig carcass now in schematic, sectional view, as seen along its central plane of symmetry. Hatched areas designate the bones of the head (cranium 32 and mandibula 33, respectively). This figure illustrates how the palate-engaging element 7a engages the palate 19 of the pig carcass and the lower-jaw-engaging element 7b engages the lower jaw 20. The blunt rear end 13 of the taper element 14 is seen engaging a hollow portion of the mandibula 33.

In FIG. 4 however, the cutter 15 has been advanced deeply into the throat (indeed, oropharynx) of the carcass in order to cut the tonsils 26 free from the soft palate 27 of the carcass.

As the cutter 15 moves upwards, into the mouth of the carcass, it reaches the soft palate 27 and cuts along and into the soft palate, cutting off the tonsils 26 protruding from the soft palate. The tonsils 26 are displaced symmetrically sideways from the central plane of symmetry of the head of the pig carcass, and are indicated by the broken line signature 26 in FIG. 4.

What is cut free from the soft palate and other walls of the oral cavity is tonsils 26, muscular and other tissue connected with the rear part of the tongue 31, and throat muscles and tissue. As the tonsils, etc., will still remain connected with the plucks set, i.e. lungs, heart etc., after being cut this way, the tonsils, etc., are now ready for being removed together with the plucks set.

Experiments carried out on the prototype shown have revealed that cutting the tonsils by means of a pointed (that is, arrow-shaped) cutting edge 24 on a curved cutter 15 will ensure that the tonsils are in fact cut free from the soft palate 27 and are not being damaged by cutting. The latter is quite essential in order to prevent contamination of the carcass with bacteria, etc., from the tonsils. Further, the experiments show that connections between the tonsils and the plucks set remain unbroken by cutting the tonsils this way from below (that is, from the snout end and through the mouth of the pig carcass). Accordingly, the tonsils will in fact leave the carcass freely together with the plucks set, when the plucks set, including tongue 31, parts of throat, trachea, oesophagus, etc., is pulled from the carcass through its chest-and-throat incision. No risk seems to be present that the connection between the tonsils and the plucks set will be disrupted by this cutting method of the disclosure. Such disruption would entail a risk that one or both tonsils be left in the carcass.

FIG. 5 shows schematically a possible way of mounting a fixing device in an automated machine for performing certain slaughter operations in a slaughterhouse. To ease overview and increase clarity, various slaughtering tools and devices 1, 12, 35, 36 are shown as being mounted on two vertical pillars 5. Some of the mountings may be made so as to render the tools and devices movable relative to the pillars, as indicated by arrows at the pillars 5 in FIG. 5. Other forms of mounting may be used in an actual machine; the skilled person will be able to provide solutions to this end.

A pig carcass 37 which is hanging by its hind legs from a gambrel (not shown) on a conveyor has been brought into the machine by the conveyor. The forelegs have been engaged and pulled backwards (towards the left in the FIG. 5) by means of two shackles 35. The snout 18 of the carcass head 17 is abutting the snout abutment 12, as the mouth of the carcass has been opened by means of the mouth-opening means in the form of the gripping device 28 (not shown in FIG. 5), so that the mouth of the carcass is now opened, ready for receiving the mouth-engaging assembly 7, which is shown below the carcass in an inactive position.

Even if only the slaughter operation of cutting the tonsils has been described above, the fixing device and method of the disclosure are advantageous for use with other slaughter operations performed to the fore-end or head of the carcass, such as cutting or loosening the jowls of the carcass from the head, in particular for cutting the jowls free from the rear portions of mandible 33; for cutting off the ears, etc.

By the terms "fixed", "fixing" etc. in the present disclosure is not necessarily meant that the parts (carcass; fixing device) cannot be moved relative to each other, but rather that the parts are held in a relatively firm engagement which will be adequate under normal conditions. The engagement of the mouth-engaging assembly 7 in the mouth of the carcass is in fact releasable if sufficient force is applied to pull the carcass from the assembly.

As will be evident to the skilled person, the disclosure is not restricted to the embodiments described above and shown in the figures. For example, the invention is not restricted to use with vertically hung carcasses, but could as well be used for carcasses lying more or less horizontally on their back, e.g. on a conveyor, or in a channel or similar.

LIST OF REFERENCE NUMERALS IN THE DRAWINGS

1 Fixing device
2 Rail
3 Arm
4 Thrust pad
5 Pillar
7 Mouth-engaging assembly
7aPalate-engaging element
7bLower-jaw-engaging element
8 Distance
9 Pneumatic cylinder
10 Direction
11 Distance
12 Snout-abutting element
13 Rear end of taper element
14 Taper element
15 Cutter
16 Direction
17 Head of carcass
18 Snout of carcass
19 Palate of carcass
20 Lower jaw of carcass
21 Wheel
22 Frame
23 Arcuate movement
24 Cutting edge
25 Carriage
26 Tonsils (tonsilla veli palatini) of carcass
27 soft palate of carcass
28 Gripping device
29 Shaft (axis of swing)
30 Mounting bracket
31 Tongue of carcass
32 Cranium of carcass
33 Mandible of carcass
34 Plucks set of carcass
35 Shackle
36 Tools
37 Carcass

I claim:

1. A fixing device for fixing a carcass such as a carcass hanging head-down from a gambrel, comprising a mouth-engaging fixing assembly for engaging the mouth of the carcass to forcibly expand the carcass mouth against the mouth's resistive forces thereby fixing the position of the carcass relative to its surroundings.

2. A fixing device according to claim 1, wherein the mouth-engaging fixing assembly comprises a palate-engaging element and a jaw-engaging element.

3. A fixing device according to claim 1, the device further comprising an abutment element adapted for abutting an upper portion of the carcass, such as a snout or forehead, thereby positioning the mouth portion of the carcass relative to the fixing device.

4. A fixing device according to claim 1, the device further comprising a mouth-opening mechanism.

5. A fixing device according to claim 4, wherein the mouth-opening mechanism comprises a set of thrust pads facing each other and being movable from an inactive position towards each other into an active position, thereby exerting a pressure on the sides of the head of the carcass and thereby opening its mouth.

6. A fixing device according to claim 1, said device further comprising a cutter, movable along and beyond the palate-engaging element and having a cutting edge at a leading end.

* * * * *